United States Patent
Zhai

(10) Patent No.: US 10,532,938 B2
(45) Date of Patent: Jan. 14, 2020

(54) MEMBRANE FILTRATION SYSTEM WITH CONCENTRATE STAGING AND CONCENTRATE RECIRCULATION, SWITCHABLE STAGES, OR BOTH

(71) Applicant: BL Technologies, Inc., Minnetonka, MN (US)

(72) Inventor: Jianwen Zhai, Beijing (CN)

(73) Assignee: BL Technologies, Inc., Minnetonka, MN (US)

( * ) Notice: Subject to any disclaimer, the term of this patent is extended or adjusted under 35 U.S.C. 154(b) by 538 days.

(21) Appl. No.: 14/775,821

(22) PCT Filed: Mar. 14, 2013

(86) PCT No.: PCT/CN2013/072588
§ 371 (c)(1),
(2) Date: Sep. 14, 2015

(87) PCT Pub. No.: WO2014/139116
PCT Pub. Date: Sep. 18, 2014

(65) Prior Publication Data
US 2016/0031726 A1 Feb. 4, 2016

(51) Int. Cl.
*C02F 1/44* (2006.01)
*B01D 61/02* (2006.01)
(Continued)

(52) U.S. Cl.
CPC ............. *C02F 1/44* (2013.01); *B01D 61/022* (2013.01); *B01D 61/142* (2013.01); *B01D 61/58* (2013.01); *B01D 63/10* (2013.01); *C02F 1/441* (2013.01); *C02F 1/442* (2013.01); *B01D 61/025* (2013.01); *B01D 61/145* (2013.01); (Continued)

(58) Field of Classification Search
None
See application file for complete search history.

(56) References Cited

U.S. PATENT DOCUMENTS

| 3,719,593 A | 3/1973 | Astil |
| 4,944,882 A | 7/1990 | Ray et al. |

(Continued)

FOREIGN PATENT DOCUMENTS

| CN | 101222970 A | 7/2008 |
| CN | 102794108 A | 11/2012 |

(Continued)

OTHER PUBLICATIONS

PCT Search Report and Written Opinion issued in connection with corresponding Application No. PCT/CN2013/072588 dated Dec. 19, 2013.

(Continued)

*Primary Examiner* — Bradley R Spies

(57) ABSTRACT

A membrane filtration system with reverse osmosis (RO) or nanofiltration (NF) elements is adapted to provide high recovery from difficult wastewater. The system has a plurality of stages. The system is configured to provide concentrate staging. The last stage also has concentrate recirculation. The valves and pumps of the system are arranged such that the order of flow and a recirculation pump may be switched between the first stage and the last stage at some times.

11 Claims, 2 Drawing Sheets

(51) Int. Cl.
*B01D 61/58* (2006.01)
*B01D 63/10* (2006.01)
*B01D 61/14* (2006.01)

(52) U.S. Cl.
CPC ...... *B01D 2311/08* (2013.01); *B01D 2311/25* (2013.01); *B01D 2313/243* (2013.01); *B01D 2317/022* (2013.01)

(56) References Cited

U.S. PATENT DOCUMENTS

| | | | |
|---|---|---|---|
| 5,250,182 | A | 10/1993 | Bento et al. |
| 5,266,202 | A | 11/1993 | Okonogi et al. |
| 6,056,878 | A | 5/2000 | Tessier et al. |
| 6,149,788 | A | 11/2000 | Tessier et al. |
| 6,187,200 | B1 * | 2/2001 | Yamamura ............ B01D 61/022 210/652 |
| 6,299,766 | B1 | 10/2001 | Permar |
| 6,787,037 | B2 | 9/2004 | Rick |
| 7,718,069 | B2 | 5/2010 | Laraway et al. |
| 2008/0179250 | A1 | 7/2008 | Muralidhara et al. |
| 2009/0134080 | A1 | 5/2009 | Fabig |
| 2010/0032375 | A1 | 2/2010 | Jagannathan et al. |
| 2012/0298569 | A1 | 11/2012 | Voelker |

FOREIGN PATENT DOCUMENTS

| | | | |
|---|---|---|---|
| CN | 202606034 U | 12/2012 | |
| JP | 2003200161 A | 7/2003 | |
| WO | 2005053824 A2 | 6/2005 | |
| WO | 2006017646 A1 | 2/2006 | |
| WO | 2006137068 A2 | 12/2006 | |
| WO | 2007064831 A1 | 6/2007 | |
| WO | 2010122336 A2 | 10/2010 | |
| WO | WO-2012175804 A1 * | 12/2012 | ........... B01D 61/022 |

OTHER PUBLICATIONS

European Search Report and Opinion issued in connection with corresponding EP Application No. 13877931.9 dated Oct. 20, 2016.
Unofficial English Translation of Chinese Office Action issued in connection with corresponding CN Application No. 201380074473.X dated Apr. 1, 2016.
Extended European Search Report for related EP Application No. 13877931.9 dated Oct. 20, 2016.
International Preliminary Report on Patentability for related PCT Application No. PCT/CN2013/072588 dated Sep. 15, 2015.
Reexamination Notice for related Chinese Application No. 201380074473.X dated Aug. 10, 2018.

* cited by examiner

MEMBRANE FILTRATION SYSTEM WITH CONCENTRATE STAGING AND CONCENTRATE RECIRCULATION, SWITCHABLE STAGES, OR BOTH

FIELD

This specification relates to membrane filtration, for example reverse osmosis or nanofiltration.

BACKGROUND

Reverse osmosis (RO) and nanofiltration (NF) membranes are typically used in the form of elements, also called modules, such as spiral wound elements, hollow fiber elements or tubular elements. A number of elements, typically between 1 and 8, are mounted in series in a pressure vessel, alternatively called a housing, with a feed inlet, concentrate outlet, and permeate outlet. Multiple pressure vessels may be connected together in parallel to form a bank, alternatively called a stage, in a filtration system. The stages of a filtration system are collectively referred to as a membrane block.

A filtration system may have multiple stages connected together in various configurations. In concentrate staging, alternatively called a multi-stage array, feed water is first pumped into a first stage of elements. Concentrate from each upstream stage is fed to each downstream stage. The concentrate port of the last stage is fitted with a concentrate valve. The flow and pressure through the membrane block are controlled by the feed pump and concentrate valve. Permeate flows from each stage to a common permeate header. The concentrate staging increases permeate recovery. Filtration systems with high recovery rates, for example 80% or more, typically have at least two stages.

BRIEF SUMMARY OF THE INVENTION

Although concentrate staging increases the recovery rate of a system, the flow rate of concentrate declines in each stage. With some types of wastewater, the flow rate in a high recovery filtration system may be insufficient to prevent fouling in the last stage.

In a filtration system described in this specification, two or more stages are connected together so as to provide concentrate staging. The last stage has a recirculation pump and conduits configured to provide concentrate recirculation. In another filtration system, valves and conduits of the system are arranged to allow the order in which feed water flows through a portion of a first and a last stage to be switched. The portion may be the entire first stage or less than the entire first stage. In an embodiment, with or without the order of flow switched, the system provides concentrate staging and concentrate recirculation in the stage that receives concentrate last.

In a filtration process described in this specification, feed water is separated into permeate and a first concentrate. The first concentrate is separated into permeate and a second concentrate. Part of the second concentrate portion is recycled and mixed with the first concentrate. In another process, the order of flow is switched between a portion of a first stage and a last stage of a filtration system at some times. The portion may be the entire first stage or a portion that is less than the entire first stage. In an embodiment, in each order, the system implements a filtration process having both concentrate staging and concentrate recirculation.

DETAILED DESCRIPTION

Figure 1:
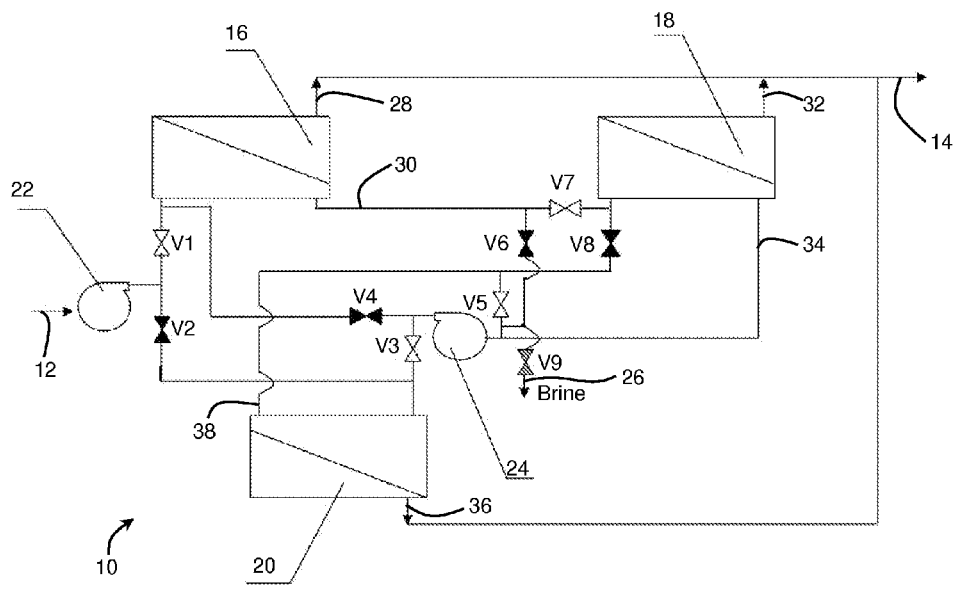
FIG. 1 is a schematic process flow diagram of a filtration system.

Referring to FIG. 1, a filtration system 10 treats feed water 12 to produce effluent 14. The filtration system 10 has a feed pump 22, a first stage 16, a last stage 20, a recirculation pump 24 and brine 26. In an embodiment, the system 10 also has one or more intermediate stages 18. In the system 10, the last stage 20 may be called the third stage although in other systems the last stage 20 could be the second stage, fourth stage or another stage. Also in the system 10, the intermediate stage 18 may be called the second stage although in other systems intermediate stages could include second, third, fourth or more stages.

Each stage comprises a set of one or more membrane filtration elements, for example nanofiltration or reverse osmosis elements. In an embodiment multiple elements in a stage are provided in series in a pressure vessel. Larger stages may comprise multiple pressure vessels plumbed in parallel, for example with a feed manifold connected to an inlet of each of the 8 pressure vessels, a concentrate manifold connected to a concentrate outlet of each of the 8 pressure vessels, and a permeate manifold connected to a permeate outlet of each of the 8 pressure vessels. In an embodiment first stage 16 is larger (i.e. has more of the same size elements) than the intermediate stage 18. In an embodiment last stage 20 is larger than the intermediate stage 18. The first stage 16 is at least as large as the last stage 20.

The filtration system also has valves V1 to V9 and various conduits configured to provide the flow paths described below. Valves V1 to V9 may move between fully opened and fully closed positions. However, in an embodiment, valve V9 is a throttle valve that may be set to various intermediate positions. The flow and pressure through the membrane block are controlled by the feed pump 22 or valve V9 or both.

In a first configuration as shown, valves V1, V3, V5 and V7 are open. Valves V2, V4, V6 and V8 are closed. Valve V9 is at least partially open to provide a bleed of brine 26 at a selected flow rate. The system 10 can also be operated in a second configuration with valves V1, V3, V5 and V7 closed; valves V2, V4, V6 and V8 open; and, valve V9 at least partially open. In both configurations, the flow rate of the brine 26 is more particularly 20% or less of the flow rate of the feed water 22. 80% or more of the feed water 22 is recovered as permeate 14.

In the first configuration, feed pump 22 pumps feed water 12 to the first stage 16. First stage permeate 28 is produced and becomes part of the effluent 14. First stage concentrate 30 is also produced and flows to the intermediate stage 18. First stage concentrate 30 flowing through a feed side of the intermediate stage 18 is separated into second stage permeate 32 and second stage concentrate 34. Second stage permeate 32 becomes part of the effluent 14. Second stage concentrate 34 flows to the recirculation pump 24. The recirculation pump 24 pumps the second stage concentrate 34 to the last stage 20. Third stage permeate 36 is produced and becomes part of the effluent 14. Third stage concentrate 38 is partially discharged as brine 26 and partially returned to the feed side of the recirculation pump 24. A portion of third stage concentrate 38 is thereby recirculated to the third stage 20. In summary, the system 10 operates with concentrate staging between the stages 16, 18, 20 and with concentrate recirculation in the last stage 20.

In the second configuration, the system 10 again operates with concentrate staging between the stages 16, 18, 20 and with concentrate recirculation in the stage receiving concentrate last. However, in this case the third stage 20 receives the feed water 12 first; the direction of concentrate staging is from the third stage 20 to the second stage 18 to the first stage 16; and first stage 16 operates with concentrate recycle, alternatively called feed and bleed.

The recirculation pump 24 and the order of flow are switched between through the first stage 16 and last stage 20 when the valves are moved from the first configuration to the second configuration. More particularly, however, the direction of flow through the feed sides of the stages 16, 18, 20 does not change when the valves are moved from the first configuration to the second configuration. Although some elements and pressure vessels may be configured for reversible flow, others have components such as brine seals or permeate collectors that only operate with flow in one direction, or are optimized for flow in one direction. In systems with multiple intermediate stages, the order of flow in an embodiment as between the intermediate stages also does not change when the valves are moved from the first configuration to the second configuration. The relative number of elements, or the piping or pumping system, may be optimized for flow in one direction between multiple intermediate stages.

The use of concentrate staging allows for a high recovery rate, for example 80% or more or between 85% and 95%. Concentrate recirculation in the last stage increases the flow rate through the last stage to help inhibit fouling. Overall permeate quality remains high since the first and second stages operate at reasonable feed side concentrations. The cost and energy consumption of the recirculation pump is limited to what is required by the last stage. However, in some cases, the last stage may still foul. Switching the order of flow at least at some times allows the last stage to be flushed with feed water to help further inhibit, or in some cases remove, fouling. In particular, some soluble organic compounds in difficult to treat wastewater can cause fouling in the last stage despite the concentrate recirculation. However, exposing the last stage to un-concentrated feed water at some times flushes the organic fouling layer from the last stage. In the system 10, the last stage 20 may be switched with the first stage 16 and receive un-concentrated feed water 12 for up to half of the operating time of the system 10.

In order to facilitate switching in an embodiment, the first stage 16 and last stage 20 are the same size, or at least about the same size. If the first stage 16 is materially larger than the last stage 20, then the last stage may be switched with a portion of the first stage 16 that is less than the entire first stage 16. In this case, the portion is more particularly the same size, or at least about the same size, as the last stage 20. For example, a portion of the first stage 16, which may be the entire first stage 16 or less than the entire first stage, that is switched with the last stage 20 may have a number of elements or pressure vessels, or both, that is within 25% of the corresponding number or numbers in the last stage 20.

The system 10 can be used to treat a variety of feed water 12. However, the system 10 is particularly adapted to providing high (80% or more) recovery from difficult to treat wastewater. The feed water 12 may have 200 mg/L or more of chemical oxygen demand (COD). Difficult waste waters include, for example, landfill leachate, coking plant wastewater, reverse osmosis brine and cooling tower blowdown. Optionally, recovery may be increased further by treating the brine, for example with a thermal evaporator, crystallizer, zero liquid discharger (ZLD) or physical-chemical treatment system.

EXAMPLES

In a first example, a three stage nanofiltration (NF) system 10 was designed for treating an industrial effluent with greater than 200 mg/l of chemical oxygen demand (COD), 90 m3/h of permeate flow, and 90% recovery. The system 10 was arranged as shown in FIG. 1. The feed pump 22 is a high pressure pump rated for 100 m3/h of output and 110 m of head. The recirculation pump 24 is rated for 110 m3/h of output and 40 m of head.

The system has 126 nominal 8 inch (20 cm) NF spiral wound elements inserted into 21 pressure vessels. Each pressure vessel holds 6 elements in series. The system has three stages 16, 18, 20. The first 16 and last 20 stages each have 8 pressure vessels plumbed in parallel. The intermediate stage 18 has 5 pressure vessels plumbed in parallel.

The first and last stages 16, 20 are identical and the recirculation pump 24, and the order of flow, can be switched between them. In one valve configuration, as shown in FIG. 1, valves V1, V3, V5 and V7 are open and valves V2, V4, V6 and V8 are closed. The feed water 12 is pumped to the first stage 16 by the high pressure feed pump 22, the concentrate from the first stage 16 is fed to the intermediate stage 18, and the concentrate from the intermediate stage 18 is fed to the last stage 20 through the recirculation pump 24. In a second valve configuration in which the first stage 16 and the last stage 20 are switched, valves V2, V4, V6 and V8 open and valves V1, V3, V5 and V7 are closed. The feed water 12 was pumped to the last stage 20 by the high pressure pump, the concentrate from the third stage 20 is fed to the intermediate stage 18 and the concentrate from the intermediate stage 18 is fed to the first stage 16 through the recirculation pump 24. In both configurations, valve V9 is a control valve operated to control the concentrate flow. A high cross-flow rate of 6-8 m3/h of concentrate per NF element was achieved in all stages.

Figure 2:
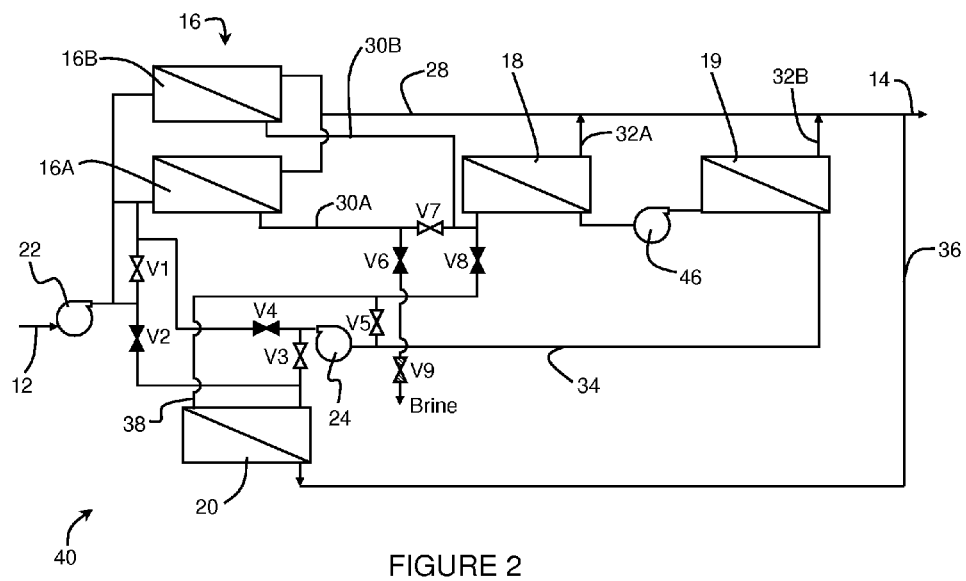
FIG. 2 is a schematic process flow diagram of a second filtration system.

In a second example, shown in FIG. 2, a second system 40 was designed for treating an industrial effluent with over 200 mg/l of COD, 90 m3/h of permeate flow, and 95% of recovery. The second system 40 has four stages 16, 18, 19 and 20. The first stage is divided into two portions, a first portion 16A and a second portion 16B. The recirculation pump 24 and the order of flow can be switched between the last stage 20 and the first portion 16A of the first stage 16. When switched, the first portion 16A of the first stage 16 receives concentrate last and the last stage 20 receives feed water first in parallel with the second portion 16B of the first stage.

The feed pump 22 is a high pressure pump rated for 100 m3/h of output and 110 m of head. The second system 40 also has a booster pump 46 rated for 40 m3/h of output and 30 m of head, and a recirculation pump 24 rated for 56 m3/h of output and 40 m of head.

The NF system has 138 nominal 8 inch (20 cm) NF elements inserted in 23 pressure vessels. Each pressure vessel holds 6 elements in series. The first stage 16 has eight pressure vessels. Five of these pressure vessels are plumbed in parallel and make up the first portion 16A. The remaining three pressure vessels are plumbed in parallel and make up the second portion 16B. A first intermediate stage 18 has six pressure vessels plumbed in parallel. A second intermediate stage 19 has three pressure vessels plumbed in parallel. The last stage 20 has five pressure vessels plumed in parallel. 5 respectively. First portion 16A and third stage 20 are identical to facilitate switching between them. Second portion 16B always receives feed water 12 directly from the feed pump 22.

When the valves are configured in a first configuration as shown in FIG. 2, valves V1, V3, V5 and V7 are open and valves V2, V4, V6 and V8 are closed. The feed water 12 is pumped to the first portion 16A and the second portion 16B of the first stage 16 by the feed pump 12. Concentrate from the first stage 16 is fed to the first intermediate stage 18 and then to the second intermediate stage through the booster pump 46. Concentrate from the second intermediate stage 19 is fed to the last stage 20 through the recirculation pump 24. When the valves are configured in a second configuration such that the first portion 16A and the last stage 20 are switched, valves V2, V4, V6 and V8 are open and valves V1, V3, V5 and V7 are closed. The feed water 12 is pumped to the last stage 20 and the second portion 16B by the high pressure pump 22. The concentrate from the last stage 20 and the first portion 16B is fed to the first intermediate stage 18 and then to the second intermediate stage through the booster pump 46. Concentrate from the second intermediate stage 19 is fed to the first portion 16A through the recirculation pump 24. Valve V9 is used as a control valve to control the concentrate flow in both configurations.

Optionally, though not shown in FIG. 2, the valves and conduits of the second system 40 could be changed such that at some times another selected portion of the first stage 16 receives the concentrate last and the last stage 20 receives feed water first in parallel with the remainder of the first stage. However, it is desirable for the portion of the first stage 16 that is switched with the last stage 20 to have the same number of elements and pressure vessels as the last stage 20 such that the recirculation pump 24 and second system 40 as a whole works well in both configurations. In the second system 20, the first stage 16 does not have twice as many pressure vessels as the last stage 20 as a result of optimizing the system design. While it would be possible to rotate which five of the eight pressure vessels of the first stage 16 are switched with the last stage 20, this complication is typically not justified since the primary purpose of switching the order of flow is to allow the last stage 20 a period of being exposed to un-concentrated feed water 12. If the first stage 16 happened to have twice as many elements and pressure vessels 20, it would be easier to rotate which portion of the first stage 16 is switched with the last stage 20. However, in most cases, the ability to switch the last stage 20 with either portion 16A, 16B in the first stage 16 would not justify altering an optimized choice of the number of elements and pressure vessels in each stage. These comments assume that fouling in the last stage 20 can be adequately controlled by exposing the last stage 20 to un-concentrated feed water 12 for one half of the system operating time or less. If not, then the system could be modified to allow for a method of operation such that the pressure vessels of the first stage 16 receive concentrate last more than half of the operating time, but a system of rotation between them results in each individual pressure vessel receiving concentrate last for less than half of the operating time.

Figure 3:
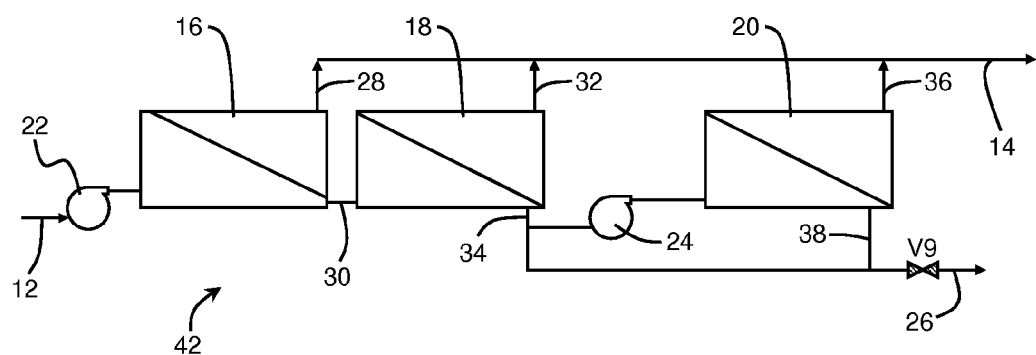
FIG. 3 is a schematic process flow diagram of a third filtration system.

In a third example, shown in FIG. 3, a third system 42 was designed for treating an industrial effluent with over 200 mg/l of COD, 90 m3/h of permeate flow, and 90% of recovery. A recirculation pump 24 was used for the last stage 20. The third system 42 is similar to system 10 of FIG. 1 but without valves and conduits allowing the order of the first stage 16 and last stage 20 to be reversed.

The third system 42 has 126 nominal 8 inch (20 cm) NF elements inserted in 21 pressure vessels. Each pressure vessel holds 6 elements in series. A high pressure feed pump 22 is rated for 100 m3/h of output and 110 m of head. A recirculation pump 24 is rated for 110 m3/h of output and 40 m of head. The thirds system 42 has three stages 16, 18, 20. The first stage 16 and last stage 20 each have 8 pressure vessels plumbed in parallel. The intermediate stage 18 has 5 pressure vessels plumbed in parallel. The feed water 12 is pumped to a feed inlet of the first stage 16 by the high pressure pump 22. The concentrate from the first stage 16 is fed to a feed inlet of the intermediate stage 18. Concentrate from the intermediate stage 18 is to a feed inlet of the third stage 20 through the recirculation pump 24.

This written description uses examples to disclose the invention and to enable any person skilled in the art to practice the invention, including making and using any devices or systems and performing any incorporated methods. The patentable scope of the invention is defined by the claims, and may include other examples that occur to those skilled in the art.

What is claimed is:

1. A membrane filtration system comprising:
   a first stage;
   a last stage;
   a feed pump;
   a recirculation pump;
   a brine outlet; and,
   a set of conduits adapted to connect, in a first configuration:
   an outlet side of the feed pump to an inlet of the first stage; a concentrate outlet of the first stage to an inlet of the recirculation pump; an outlet of the recirculation pump to an inlet of the last stage only; and a concentrate outlet of the last stage to the brine outlet and to the inlet of the recirculation pump, such that a fluid pumped by the feed pump flows through the first stage, then through the recirculation pump, then through the last stage, then to the recirculation pump and brine outlet such that concentrate is recirculated through only the last stage in the first configuration.

2. The system of claim 1 further comprising a first intermediate stage wherein the set of conduits connects the concentrate outlet of the first stage to the inlet of the last stage through a feed side of the first intermediate stage, such that the fluid flows from the concentrate outlet of the first stage, through the first intermediate stage, and to the recirculation pump.

3. The system of a claim 2 further comprising a second intermediate stage wherein the set of conduits connects a concentrate outlet of the first intermediate stage to the inlet of the last stage through a feed side of the second intermediate stage, such that the fluid flows from the concentrate outlet of the first intermediate state, through the second intermediate stage, and to the recirculation pump.

4. The system of claim 3 further comprising a concentrate booster pump between the first intermediate stage and the second intermediate stage.

5. The system of claim 2 wherein the first stage is larger than the first intermediate stage and the last stage is larger than the first intermediate stage.

6. The system of claim 1 further comprising a set of valves wherein the set of valves and the set of conduits are adapted to selectively switch to a second configuration in which the order of flow is switched between a portion of the first stage and the last stage.

7. The system of claim 6 wherein the portion of first stage has the same number of filtration elements in the same number of parallel pressure vessels as the last section.

8. The system of claim 6 wherein the first stage is about the same size as the last stage and the portion of the first stage is the entire first stage or the first stage is larger than the last stage and the portion of the first stage is less than the entire first stage but about the same size as the last stage.

9. The system of claim 6 wherein the set of valves and the set of conduits are adapted to selectively connect an outlet side of the feed pump to the inlet or the concentrate outlet of the last stage.

10. The system of claim 6 wherein the set of valves and the set of conduits are adapted to selectively connect the outlet of the recirculation pump to the inlet or the concentrate outlet of a portion of the first stage.

11. The system of claim 6 wherein the set of valves and the set of conduits are adapted to selectively connect, in the second configuration:
    the outlet side of the feed pump to the inlet of the last stage;
    the concentrate outlet of the last stage to the inlet of the recirculation pump;
    the outlet of the recirculation pump to the inlet of the first stage only or a portion of the first stage only; and,
    the concentrate outlet of the first stage or the portion of the first stage to the brine outlet and to the net of the recirculation pump,
    such that aged pumped by the feed pump flows through the last stage, then through the recirculation pump, then through the first stage or the portion of the first stage, then to the recirculation pump and brine outlet such that concentrate is recirculated through only the first stage in the second configuration.

* * * * *

UNITED STATES PATENT AND TRADEMARK OFFICE
CERTIFICATE OF CORRECTION

PATENT NO. : 10,532,938 B2
APPLICATION NO. : 14/775821
DATED : January 14, 2020
INVENTOR(S) : Jianwen Zhai Page 1 of 1

It is certified that error appears in the above-identified patent and that said Letters Patent is hereby corrected as shown below:

In the Claims

In Column 8, Line 11-12: delete "to the net of the recirculation pump," and replace with "to the inlet of the recirculation pump,".

In Column 8, Line 13: delete "such that the aged pumped" and replace with "such that a fluid pumped".

Signed and Sealed this
Eighteenth Day of August, 2020

Andrei Iancu
*Director of the United States Patent and Trademark Office*